United States Patent [19]
Smith

[11] Patent Number: 5,372,018
[45] Date of Patent: Dec. 13, 1994

[54] WHEEL LOCK

[76] Inventor: Ronald Z. Smith, 2605 W. Sexton Dr., Springfield, Mo. 65810

[21] Appl. No.: 123,567

[22] Filed: Sep. 20, 1993

[51] Int. Cl.[5] .................................................. B60R 25/00
[52] U.S. Cl. ....................................... 70/18; 70/19; 70/56; 70/226; 188/32
[58] Field of Search ........................ 70/54-56, 70/18, 19, 225, 226, 14, 227, 209, 237, 238, 211, 212; 188/32

[56] References Cited

U.S. PATENT DOCUMENTS

| | | | |
|---|---|---|---|
| 1,424,106 | 7/1922 | Lake et al. | 70/18 |
| 3,606,423 | 9/1971 | McCarthy | 70/55 X |
| 3,664,164 | 5/1972 | Zaidener | 70/211 X |
| 3,695,071 | 10/1972 | West | 188/32 X |
| 4,003,227 | 1/1977 | Casey | 70/19 X |
| 4,768,359 | 9/1988 | Wade | 70/226 X |
| 4,819,462 | 4/1989 | Apsell | 70/226 X |
| 4,833,442 | 5/1989 | Von Heck | 70/226 X |
| 4,854,144 | 8/1989 | Davis | 70/226 |
| 5,134,868 | 8/1992 | Bethards | 70/226 X |
| 5,137,121 | 8/1992 | Leonard | 70/226 X |
| 5,176,013 | 1/1993 | Kutauskas | 70/226 X |
| 5,247,815 | 9/1993 | Caldwell | 70/226 X |
| 5,284,036 | 2/1994 | Rosenbaum | 70/212 X |

FOREIGN PATENT DOCUMENTS

| | | | |
|---|---|---|---|
| 498547 | 10/1950 | Belgium | 70/19 |
| 0076348 | 5/1983 | Japan | 70/225 |
| WO86/05150 | 9/1986 | WIPO | 70/226 |

Primary Examiner—Lloyd A. Gall
Attorney, Agent, or Firm—Shook, Hardy & Bacon

[57] ABSTRACT

A wheel lock is disclosed for securing to the wheel of a vehicle to impede rotation of the wheel to prevent theft of the vehicle. The wheel lock comprises a clamp having opposed arms which are movably coupled together. Each arm carries a projection extending inwardly with respect to the other projection to form an opening therebetween. The projections being carried by the arms can be moved apart to a first position in which the opening is sufficient to be received over the tire and rim of the wheel and the projections can thereafter be moved inwardly to a second position in which the opening between the projections of the opposed arms prevents the clamp from being disengaged from the wheel. The wheel lock further comprises position locking structure for selectively releasably locking the projections of the clamp in the second position to prevent the wheel lock from being disengaged from the wheel.

5 Claims, 1 Drawing Sheet

WHEEL LOCK

This invention relates to a device for preventing theft of a vehicle, and more particularly, to a device for releasably securing to the wheel of the vehicle to impede movement of the vehicle when the lock is secured thereto.

BACKGROUND OF THE INVENTION

Vehicle theft is a longstanding problem. Many attempts have been made to develop devices or systems for preventing or impeding such thefts. Alarm systems are known which do not prevent movement of the vehicle, but rather sound an alarm, visual and/or audio, when the vehicle is moved or entered while the alarm is activated. Nevertheless, experienced thieves typically are able to deactivate the alarms with little difficulty. Even without deactivating the alarm, it is still possible to steal the vehicle.

Prior devices have also been used to secure to the wheel of a vehicle to prevent movement of the vehicle. However, to the best of applicant's knowledge, such devices are bulky and difficult to secure to the vehicle wheel.

Other devices have been developed for securing to the steering wheel of the vehicle to prevent driving of the vehicle while the device is secured thereto. However, thieves have overcome such devices by cutting away a portion of the steering wheel with a cutting tool and removing the device. Moreover, such devices typically only have utility for vehicles having a steering system, such as cars or trucks. The devices are not adapted to prevent theft of vehicles such as trailers and the like.

Nor do alarm systems provide protection against theft for most trailers because the trailers are typically stored in remote areas where alarms provide little or no deterrent effect. This problem is particularly significant for boat trailers. Many boat owners store their boats on boat trailers at remote marinas or other docking facilities. The boat owner is often unable to watch the trailer because the boat owner normally does not reside at or near the marina. A thief need only drive a vehicle having a trailer hitch to the marina and connect the trailer to the hitch to steal the boat and trailer. Trailer stealing is also a problem common to locations other than marinas.

Thus, there is currently a need to provide a device which can be easily applied yet which prevents the theft of a vehicle and is particularly adapted to prevent the theft of trailers.

SUMMARY OF THE INVENTION

It is therefore an object of the present invention to provide a device for readily securing to the wheel of a vehicle to prevent theft of the vehicle. More particularly, it is an object to provide such a device which has an easily adjustable opening to facilitate mounting and securing of the device to the vehicle. Moreover, an object is to provide such a device which has a plurality of locking positions so that the device is adapted to be used with various sized wheels.

Another object of the invention is to provide a device which implements a conventional locking device to allow quick and effective locking and unlocking of the device. Additionally, an object is to provide a shielding structure to prevent tampering with the lock by means such as cable cutters. Also, an object is to position the lock and shielding structure on the device so that it is adjacent the tire tread of the wheel when the device is secured to the wheel to impede rotation of the tire. A further object is to construct the device from a strong material which cannot readily be cut through or otherwise tampered with to prevent unauthorized removal of the device from the wheel.

BRIEF DESCRIPTION OF THE DRAWINGS

In the accompanying drawings which form a part of the specification and are to be read in conjunction therewith and in which like reference numerals are used to indicate like parts in the various views.

DESCRIPTION OF THE PREFERRED EMBODIMENT

Figure 1:
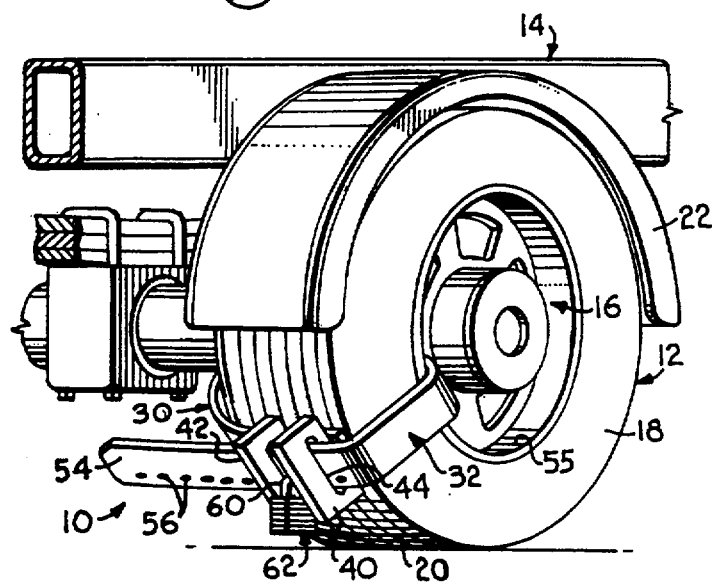
FIG. 1 is a fragmentary perspective view of a vehicle showing the wheel lock of the present invention secured to a wheel.
Figure 2:
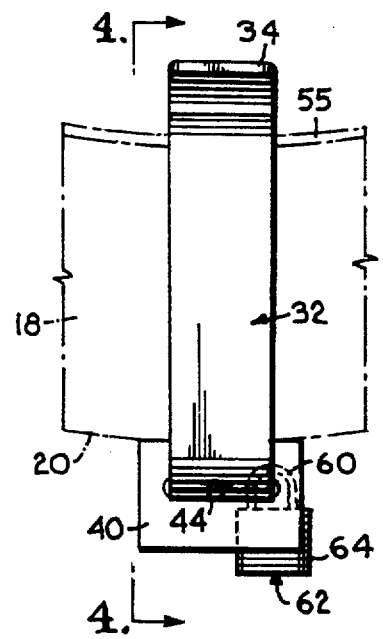
FIG. 2 is an end elevational view on a larger scale of the device in its installed position, the tire of the wheel being shown fragmentally in phantom.

Referring now to FIG. 1, the wheel lock constructed according to a preferred embodiment of the present invention is designated generally by the numeral 10. Lock 10 is adapted to be secured to a wheel 12 of a vehicle, such as trailer 14, only a portion of the frame and axle assembly of the trailer being shown. As is well known, wheel 12 includes a rim 16 and a tire 18 having tread 20. Trailer 14 also typically includes a wheel guard 22 to prevent mud and gravel from being thrown by the tire tread upwardly towards the unit on the trailer, such as a boat or camper.

Figure 4:
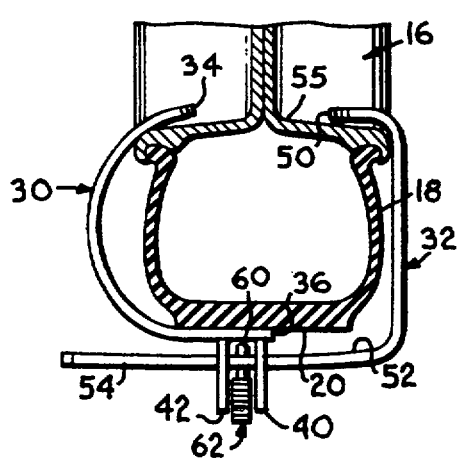
FIG. 4 is a detailed cross-sectional view taken along line 4—4 of FIG. 2 but on the scale of FIG. 1.
Figure 5:
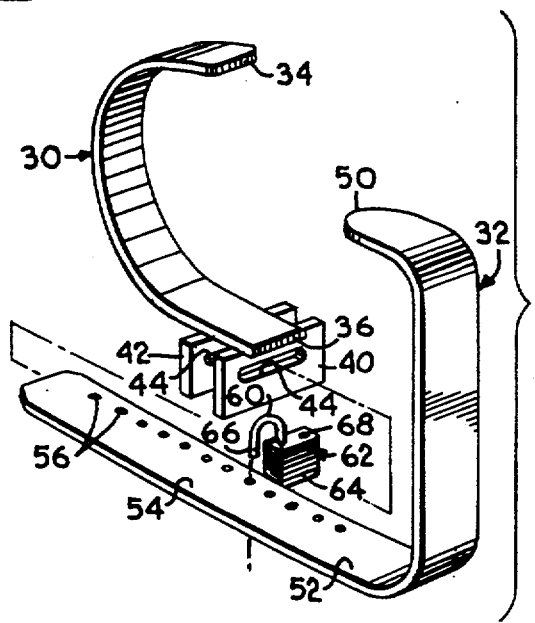
FIG. 5 is an exploded perspective view of the device showing components thereof.

Referring to FIG. 5, wheel lock 10 generally comprises a pair of opposed C-shaped arms or 4brackets 30 and 32. Bracket 30 includes a projection end 34 and a mounting end 36. A pair of opposed brackets in the form of rectangular plates of flanges 40 and 42 are secured orthogonally to C-shaped bracket 30 adjacent the mounting end by known means, such as welding the edges of the flanges to the proximal surface of bracket 30. Referring to FIG. 4, the flanges 40 and 42 are spaced apart longitudinally of bracket 30 so that a gap is formed between the flanges 40 and 42. Flanges 40 and 42 have opposed, aligned slots 44 for receiving C-shaped bracket 32, as will be described below. As shown in FIG. 1, flanges 40 and 42 are secured to mounting end 36 of bracket 30 and extend generally radially outwardly from tire tread 20 in disposition to impede rotation of the wheel. Also, flanges 40 and 42 are in position to contact the trailer wheel guard or fender 22 upon rotation of the wheel. This further prevents rotation of the wheel when the wheel lock is secured thereto. However, the wheel guard 22 is not necessary for effective operation of wheel lock 10.

Referring to FIGS. 4 and 5, C-shaped bracket 32 includes a projection end 50 which opposes projection end 34 of bracket 30. Bracket 32 also has a mounting end 52 and an extension arm 54 extending therefrom. Extension arm 54 is preferably formed integrally with end 52 of bracket 32. The extension arm is sized to be slidably received through aligned slots 44 of flanges 40 and 42. An opening is formed between the projection ends 34 and 50 of brackets 30 and 32, respectively. The size of the opening can be adjusted by slidably moving bracket 32 to and from bracket 30 to decrease and increase the size of the opening, respectively. Thus, the opening between the end of the projections can be adjusted to a first position to be received over the tire 18 and rim 16 of wheel 12. Thereafter, the opening can be decreased to a second position by moving the C-shaped brackets closer together so that the projection ends are received within the recess 55 of rim 16 as shown best in FIGS. 1 and 4. In this latter position, the projection ends prevent wheel lock 10 from being disengaged from the wheel.

Figure 3:
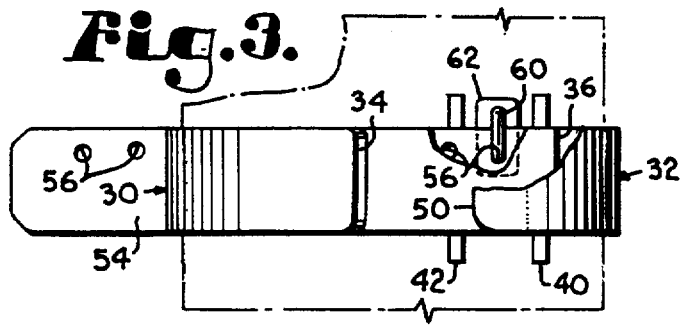
FIG. 3 is a top plan view on the scale of FIG. 2 of the device in its installed position, the tire being shown fragmentally in phantom portions of the device and wheel being broken away to reveal details of construction and the lock.

The device of this invention further includes means for locking wheel lock 10 in one of a plurality of positions so that the wheel lock is adapted to be secured to various sized wheels. Apertures 56 are formed in extension arm 54 and are sized to receive the locking arm 60 of lock 62, as shown in FIG. 5. As shown best in FIGS. 3 and 4, C-shaped brackets 30 and 32 may be adjusted until one of the apertures 56 aligns within the space formed between brackets 40 and 42. Locking arm 60 is thereafter inserted through the aligned aperture and lock 62 is locked by turning the lock body 64 until end 66 is aligned with locking chamber 68. End 66 is then pushed within chamber 68 and end 66 is locked within the chamber, as is well known in the art. Referring to FIG. 4, the flanges 40 and 42 prevent longitudinal movement of the brackets 30 and 32 when lock 62 is secured to an aperture 56, and thus prevent the adjustment of the opening between projection ends 34 and 50 of brackets 30 and 32, respectively. Wheel lock 10 therefore cannot be disengaged from wheel 12 while the lock 62 is secured to the aligned aperture.

In operation, when the lock 62 is not secured to one of the apertures 56, the opening between the projection members can therefore be increased by slidably moving C-shaped brackets 30 and 32 apart until the space is sufficient to be received over the tire and rim of wheel 12. When the size is sufficient, the wheel lock is moved radially inwardly towards the rim until the projection ends 34 and 50 are adjacent to the recess of rim 16. Thereafter, the C-shaped brackets are slidably moved together to decrease the space between the projection ends to a position in which the projection ends are received within recess 55 of rim 16 and in which an aperture 56 is aligned with the space between flanges 40 and 42. Finally, the locking arm or shackle 60 of a lock in the form of padlock 62 is inserted through the aligned aperture and is manipulated to its locked position. Wheel lock 10 is thereby secured in place and cannot be disengaged from wheel 12, thus preventing movement of the vehicle. To remove the wheel lock, the procedure need only be reversed.

It should be noted that flange 42 could be omitted and yet effective operation of the wheel lock might still be achieved because flange 40 prevents outward movement of C-shaped bracket 30 away from bracket 32 when lock 62 is secured to an aperture 56 which has been received through slot 44. However, flange 42 is desirable because it cooperates with flange 40 to create a gap or space which shields lock 62 from removal by means such as cable cutters. The space between flanges 40 and 42 should preferably be less than two inches (2"). Further, flange 42 significantly increases the torquing force necessary to pry off the wheel lock, such as might occur if a crowbar were applied to one of the C-shaped brackets 30 or 32.

Brackets 30 and 32 are preferably constructed of relatively heavy, generally thick, wide steel straps which resist bending and which can be cut through only with considerable difficulty. They are substantially resistant to cutting by bolt cutters. Since arm 60 is shielded by flanges 40 and 42 from access by such cutters, wheel lock 10 is not readily susceptible to removal by a thief by cutting.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A wheel lock for a vehicle wheel having a tire and rim, the wheel lock being adapted to be secured to the wheel to prevent unauthorized moving of the vehicle, the wheel lock comprising:

a clamp having a pair of opposed generally C-shaped arms constructed of relatively heavy, wide steel straps, each arm having a projecting end disposed so that each respective arm end extends inwardly toward the projecting end of the other arm with a space defined between said arm ends;

a pair of generally flat, mutually spaced apart plate flanges integrally secured to one of said arms and disposed to project outwardly therefrom, there being a slot in each flange with the slots being disposed in alignment to telescopically receive therethrough the other arm for movably coupling the arms together for movement of the arms apart to enlarge said space to permit the clamp to be installed over or removed from the tire and rim of said wheel, and for movement of the arms closer together to diminish said space to prevent removal of the clamp from disposition installed on said tire and rim of the wheel; and at least one aperture in said other of said arms disposed between said flanges when the clamp is installed over the tire and rim of the wheel, said at least one aperture being adapted to receive a shank of a padlock for releasably locking the clamp in said installed disposition with a body of the padlock disposed between said flanges whereby the flanges are in position to physically limit access to the padlock to deter the cutting of the padlock.

2. The wheel lock of claim 1 wherein a plurality of aligned, mutually spaced apart apertures are formed longitudinally along said other arm.

3. The wheel lock of claim 1 wherein the space between said flanges is less than two (2) inches.

4. The wheel lock of claim 3 wherein there is included a padlock received in said at least one aperture.

5. The wheel lock of claim 1 wherein the C-shaped arms have a width greater than three (3) inches.

* * * * *